April 22, 1930. M. LOUGHEAD 1,755,829
BRAKE
Filed June 14, 1926 2 Sheets-Sheet 1
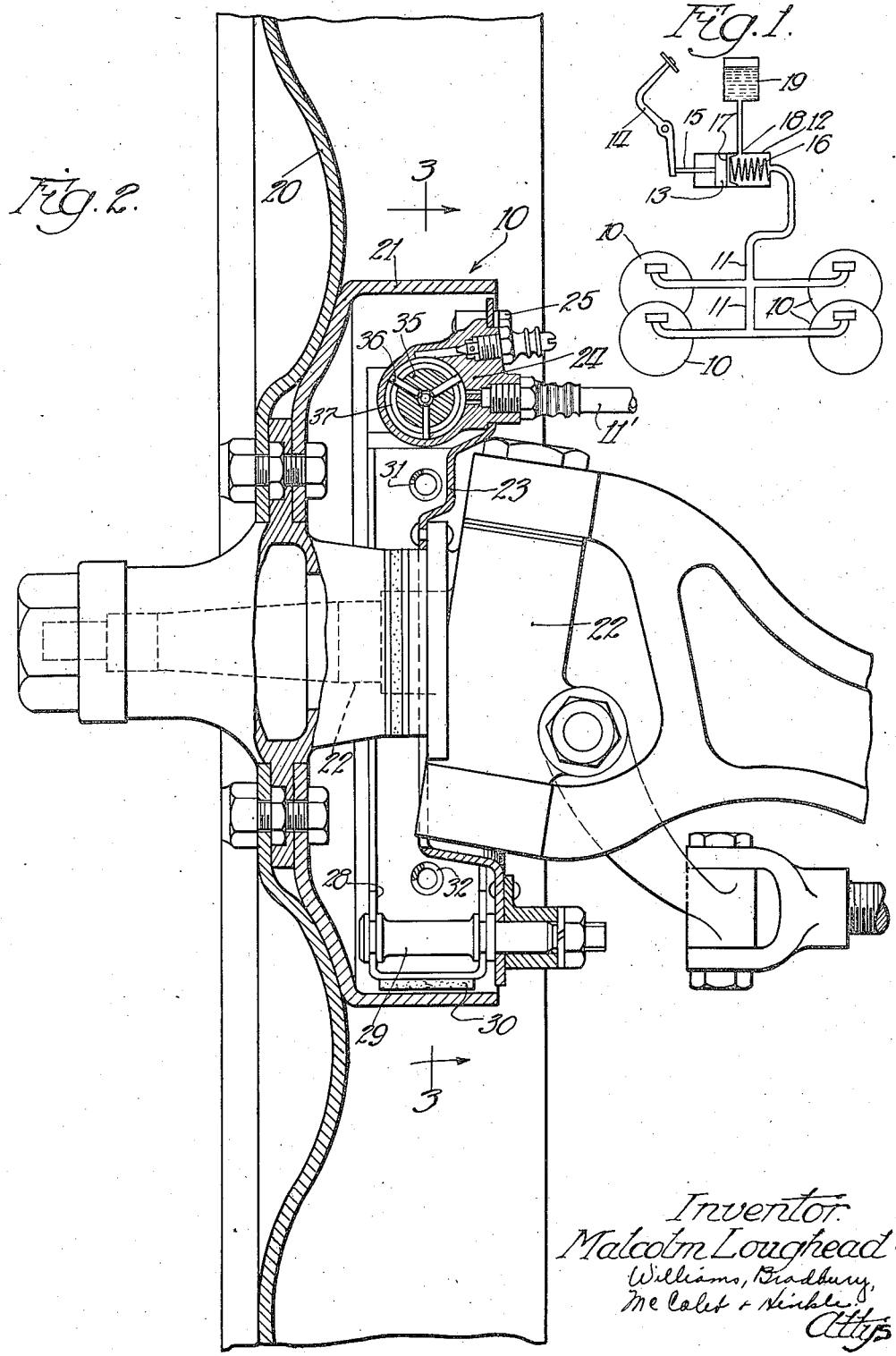
Inventor
Malcolm Loughead April 22, 1930.　　　M. LOUGHEAD　　　1,755,829
BRAKE
Filed June 14, 1926　　2 Sheets-Sheet 2
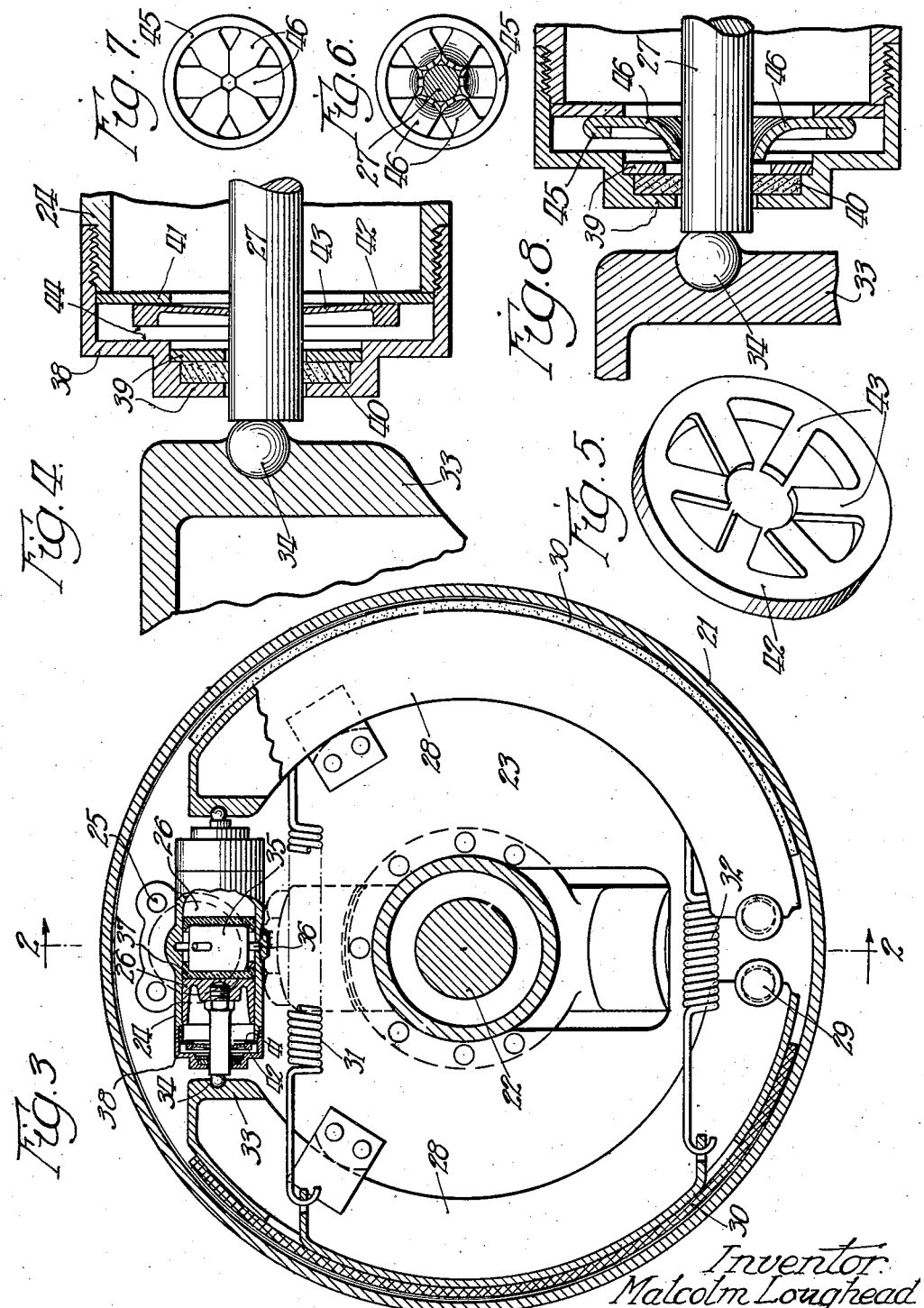
Inventor
Malcolm Loughead
Williams, Bradbury, McCalet & Hinkle
Attys.

Patented Apr. 22, 1930

1,755,829

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

BRAKE

Application filed June 14, 1926. Serial No. 115,750.

My invention relates to brakes and more particularly to automobile brakes although, as will be seen, it is not necessarily restricted to that use. The primary object of my invention is to provide an automatic take-up mechanism for the brake-shoe (or brake-band) which compensates for the wear of the brake lining or other element subject to wear, but still preserves a constant slack for the brake-shoe.

Another object of my invention is to provide a take-up mechanism which will permit recession as well as progression of the brake applying member, so that the take-up mechanism does not unduly complicate the process of relining and renewing the brake-shoes.

Another object is to compensate for the progression of the brake-shoe applying member so as to utilize at all times the full movement of the brake pedal or other actuator. I accomplish the latter result by an extensible connection between the brake applying member and the actuator, which connection, in the preferred form of my invention, takes the form of a liquid column which is extensible by means of a replenishing device for the liquid column.

The chief advantage of a take-up mechanism for the brakes is that it preserves the full effect of the possible movement of the brake pedal or other actuator, which, if excessive slack were allowed to develop, would be consumed in taking up the excessive slack. In other words, if there is no excessive slack, the full movement of the brake pedal may be utilized to increase the leverage, that is, increase the ratio between the pressure on the brake shoe and the foot pressure on the pedal.

In the preferred form of my invention, I employ a take-up mechanism which embodies stop means between the shoe or the brake applying member and a stationary point—as distinguished from merely lengthening (or contracting, as the case may be) the brake applying member. One of the cooperating stops is mounted so that it can progress on its support under a forceful application of the brakes. Although a non-recessional take-up device such as a ratchet is suitable for this purpose, it has the disadvantage of step-by-step advance which is obviated by the frictional advance of my construction.

An important characteristic of the structure is that the retractile stop advances in one direction under excess braking application pressure and that it withstands the pressure of the brake shoe retractile springs in the other direction.

These and other objects, features and advantages of my invention are set forth in the following description of a particular and preferred embodiment thereof, as illustrated in the accompanying drawings wherein:

Fig. 1 is a diagrammatical layout of the fluid system of a hydraulic braking apparatus for automobiles embodying my invention;

Fig. 2 is a transverse vertical section through the left front wheel of an automobile embodying a braking system such as illustrated diagrammatically in Fig. 1, Fig. 2 being considered as taken on the line 2—2 of Fig. 3 and looking rearwardly;

Fig. 3 is a vertical section taken along the plane of the wheel of Fig. 2 and looking inwardly;

Fig. 4 is an enlarged detail cross section of the end of the wheel brake cylinder of Fig. 3 and shows the take-up mechanism itself;

Fig. 5 is a perspective view of the spider ring of the take-up mechanism of Fig. 4;

Fig. 6 is a modified form of spider which may be made of punched and drawn metal;

Fig. 7 illustrates the spider in a partially completed condition.

Fig. 8 is a partial section of a wheel cylinder and brake shoe illustrating the modified form of spider in position.

Referring first to the diagram of Fig. 1, the hydraulically actuated wheel brakes 10 on each of the road wheels of an automobile are inter-connected by high pressure hose and tubing 11 with a master cylinder or compressor 12, the piston 13 of which is actuated by the usual brake pedal 14 through suitable linkage 15. As will be later described, the wheel brakes 10 have return springs which, when foot pressure on the pedal 14 is relieved, return the liquid of the system to the cylinder 12 and returns the piston 13 to its normal position. If from any loss of liquid through the fluid system, there is insufficient liquid to return the piston to its normal position, the piston is returned positively by a spring 16, so that the cup packing 17 of the piston uncovers a port 18 in the cylinder wall leading to a vented liquid reservoir 19 from which liquid will flow into the cylinder until the system is replenished to its necessary volume.

Referring next to Figs. 2 and 3 which show the structure of typical wheel brakes 10 of Fig. 1, each wheel 20 carries a brake drum 21, while the steering spindle 22 (or in the case of the rear wheel brakes, the rear axle housing) carries a non-rotating supporting plate 23 which also acts as a dust plate to close the open side of the drum 21. A brake cylinder 24 is mounted on the outer side of the plate 23, that is, on the outer side as regards the center line of the automobile, but within the enclosure formed by the drum and plate 23, and is secured to the plate by suitable bolts or cap screws 25.

The cylinder 24 itself is made open at both ends and reciprocally supports a pair of opposed pistons 26, which carry rigidly attached piston rods 27 projecting outwardly beyond the respective ends of the cylinder.

The outer ends of the piston rods 27 abut the free ends of arcuate internal brake-shoes 28 which are pivotally mounted on the supporting plate 23 diametrically opposite the cylinder 24 by means of pins 29. The pins 29 are eccentric to provide a slight adjustment of the fixed ends of the brake-shoes as regards the distance of their linings from the drum when the shoes are initially installed.

The brake-shoes 28 are of channel cross-section, the linings 30 being secured along their web portions. The free ends of the opposed shoes 28 are urged together by a tension spring 31 and their lower ends by a tension spring 32.

The free ends of the shoes 28 have opposed closures 33 across their channels and are provided with hardened steel abutments in the form of hardened steel balls 34 set within the closures 33 for contact by the piston rods 27.

Liquid under pressure from the fluid system of my braking apparatus is, as I previously described, led to the several wheel brakes by high pressure tubing 11, being finally delivered through flexible hose 11' to each brake cylinder 24, as shown in Fig. 2. The liquid enters the cylinder at its mid-point between the opposed pistons 26. To cut down the volume of liquid employed, I employ a displacement block 35 positioned axially of the cylinder 24 at its mid-point by radial pins 36. The block 35 thus acts not only to displace a substantial volume of liquid, but also acts as a stop for the pistons which locates them equidistant from the mid-point of the cylinder and also protects the edges of the floating cup washers 37.

Each end of the cylinder 24 is closed by a cap 38 externally threaded thereon. The cap embodies a pair of spaced disc portions 39, having a central opening through which one of the piston rods 27 slides. A felt packing ring 40 is clamped between the disc portions 39 to exclude dirt from the interior of the cylinder.

A washer 41 is carried within the cap 38 and abuts the end of the cylinder 24. This leaves a space between the washer 41 and the end wall of the cap 38. A spider ring 42 is disposed within this space and permitted to float therein. The spider ring comprises a peripheral ring portion and a plurality of spoke-like fingers 43 extending inwardly therefrom. These fingers are not joined to a hub at their inner ends, but on the contrary are left free, giving them a certain amount of spring. The fingers 43 are cut with rather sharp corners at their inner edges, but the plane of the fingers is somewhat dished as shown in Fig. 4. The inner ends of the fingers are arcuately formed to constitute a non-continuous bore which fits very snugly on the piston rod 27. On account of the slight dishing of the fingers, the piston rod 27 is more readily slid outwardly than inwardly relatively to the spider ring.

When the spider ring 42 is pressed upon the piston rod 27 its tongues bend outwardly to an angle with the face of the metal, the size of opening in the spider being such that the angle maintained permits a movement of the rod 27 through the spider in either direction, the amount of pressure required for moving in one direction, however, being much greater than in the other. The spider ring 42 acts as a collar on the piston rod 27, limiting the movement of the piston to the space 44, that is, to a movement which equals the distance between the cap 38 and the washer 41 minus the thickness of the spider ring 42. The space 44 represents the slack allowed for the retraction of the brake shoes from their position of maximum application.

The form of spider illustrated in Figs. 6, 7, and 8, may be punched and formed from sheet metal. The rim 45 is formed by turning the outer edge back upon one face. The tongues 46 are first slit from a plate by means of a punch and die. These tongues are later formed to shape as illustrated in Figs. 6 and 8. The spider is preferably given a spring hardening after its forming operation so that the tongues of the spider bear upon the shank 27 with sufficient pressure to withstand the force of the brake retractile spring 31 even under road vibration.

Let us suppose, for example, that the spider ring 42 is so positioned on the piston rod 27 as just described, that when the brakes are fully applied with the maximum foot pedal pressure, the spider ring 42 is carried forwardly so it just contacts the cap 38. Then, if the brake lining should thereafter wear a trifle thinner, say, for example, .005 of an inch, and the brakes were thereafter applied with maximum foot pedal pressure, when the piston rod 27 moved outwardly to bring the outer face of the spider ring 42 just into contact with the cap 38, the outer face of the lining would still be .005 of an inch out of maximum contact with the drum. As the foot pressure on the brake pedal continued to build up outward pressure on the piston rod 27, the pressure would soon exceed the pressure necessary to slide the rod outwardly relatively to the spider ring 42. This pressure would preferably correspond to about 15 pounds pressure per square inch on the fluid system. Having thus overbalanced the friction of the spider ring on the rod, the latter would be moved outwardly .005 inches relatively to the spider ring. When the foot pedal is again released, the piston rod, and hence the piston, would not come back to its former position, but instead to a position .005 of an inch outwardly from its former position. Thus the range of movement permitted the piston, as represented by the distance 44 of Fig. 4, would be progressed outwardly .005 of an inch.

Similarly for further wearing down of the lining by infinitesimal degrees, the position of the piston 26 continually progresses outwardly until the lining is worn so far that it has to be renewed. It will be understood, of course, that after the initial setting of the brakes, as soon as the linings start to wear the pistons will be carried permanently away from contact with the displacement block 35, so that the latter functions as a stop merely in initial setting of the brakes.

If no means were employed for replenishing the fluid system, even though no losses were occasioned from leakage, the automatic take-up mechanism just described would soon impair the effectiveness of the full possible movement of the brake pedal because, as each piston is from time to time progressed outwardly, an increasingly large volume of liquid must be taken from the system to compensate for the increasing outward displacement of the piston, and the volume of the fluid system as a whole increases at eight times this rate because there are four wheel brakes and two pistons to each brake. The result would be that the driver would in time find the foot pedal going down to the floor board without giving substantial braking effect. However, with the use of an automatic replenishing device, such for example as that illustrated in Fig. 1, the fluid system remains completely filled with a liquid at all times, and this is true whether the replenishing is merely to compensate for actual fluid losses from the system or to compensate for enlarging of the volume of the system. The important effect of this, or any other replenishing means, in the operation of a system employing an automatic take-up mechanism of the general type I have shown, is that the liquid column may also be extended.

Attention is also called to the fact that while the spider ring 42 is mounted on the piston rod 27 to give an action equivalent to a ratcheting mechanism, recessional movement is not absolutely prevented. Thus, under sufficient pressure the piston rod 27 can be moved inwardly relatively to the spider ring 42, but the pressure necessary to do this would be one which would correspond, in the fluid pressure on the piston, to some 200 pounds. The return springs 31 between the free ends of the brake shoes would be entirely too weak to accomplish this recession. However, when the brake shoes are relined, it is not necessary to remove the cap 38 and withdraw the pistons 24 in order to slide the spider ring toward the outer end of the piston rod. Instead the end of the piston rod can be engaged by any handy method, such, for example, as inserting the blade of a screwdriver between the closure 33 at the end of the brake shoe and the end of the piston rod 27 and turning it to exert a considerable inward pressure on the piston rod. In this way the take-up mechanism does not in any way complicate the operation of relining the brake shoes.

While I have described but this one specific embodiment of my invention, I contemplate that many changes may be made therein without departing from the scope or sphere of my invention.

What I claim is:

1. A hydraulically actuated braking system for an automobile comprising in combination, a wheel brake comprising a drum, a shoe, a shoe applying piston, and means for retracting the shoe, and a take-up mechanism having a stationary anchorage for limiting the retraction of the piston, said mechanism embodying a yielding slip connection permitting a progression of its retractile limit for the piston under heavy pressure on the piston and permitting a recession of said limit under pressure greater than that of the retracting means.

2. In a hydraulic braking apparatus, a wheel cylinder, a brake shoe, piston mechanism for said cylinder operatively connected with said shoe, a friction ring engaging said piston mechanism and adapted to be moved relative to said piston mechanism in either direction when abnormal pressure is applied thereto, and a pair of stops permitting a limited movement of said friction ring with said piston mechanism.

3. In a hydraulic braking system, a wheel cylinder, a brake shoe, a brake shoe lining, a brake drum, a piston structure movable in said cylinder to apply the brake shoe lining against said drum, a slack take-up mechanism comprising a friction device operating between said cylinder and said piston structure, said device being movable in either direction through the application of abnormal force and having a limited amount of free movement with respect to either the cylinder or the piston structure, the degree of said free movement determining the distance which the brake shoe lining may be retracted from the drum.

4. In a hydraulic braking apparatus, a brake drum, a brake shoe, a spring for retracting the brake shoe, brake shoe actuating means, a rod connecting the actuating means, with the brake shoe, a spider ring having radial inwardly extending tongues encompassing said rod and having its tongues in frictional engagement with the rod, said tongues extending forwardly of the ring to permit the longitudinal movement of the rod in one direction but to resist movement of the rod in the opposite direction under the force of said spring, and a stationary stop member, one on each side of said ring spaced apart from one another, and spaced apart from the ring a distance equivalent to the normal movement of the brake shoe in operation.

5. In a hydraulic braking apparatus, a brake drum, a pair of brake shoes, a spring for retracting the brake shoes, a brake shoe actuating means, rods connecting the actuating means with the brake shoes, spider rings having radial inwardly extending tongues encompassing said rods and having their tongues in frictional engagement with the rods, said tongues extending forwardly of the rings to permit the longitudinal movement of the rods in one direction but to resist movement of the rods in the opposite direction under the force of said spring, and a pair of stationary stop members for each ring, one on each side of said rings, spaced apart from one another, and spaced apart from the rings a distance equivalent to the normal movement of the brake shoes in operation.

6. In a hydraulic brake system, a brake element, a rod for actuating the brake element, a stop mechanism associated with the said rod comprising an annular ring, a plurality of fingers extending inwardly from the ring engaging the rod, said fingers being bent out of the plane of the ring to offer a greater frictional resistance to movement in one direction along the rod than in the other direction, and a stop member on each side of the ring spaced apart a distance equivalent to the normal movement of the rod.

7. In a hydraulic brake system, a brake element, a rod for applying the brake element, means for exerting a retracting force upon the brake element, a stop mechanism for limiting the retractile movement of the brake element, said mechanism embodying a yielding connection permitting a progression of the retractile limit of the brake element and permitting the recession of the retractile limit under a force greater than that exerted by the means for applying a retracting force.

8. A mechanism for automatically taking up the slack in a braking system in which wear members are provided, a pair of frictionally engaged members adapted to be moved relative to one another through the application of an abnormal braking force, a retractile spring for the wear member, the force of said spring being slightly less than is necessary for moving said friction members upon one another, one of said friction members having limited movement between stops whereby the wear member will have the same limited movement between its normal position and its brake applying position.

In witness whereof, I hereunto subscribe my name this 9th day of June, 1926.

MALCOLM LOUGHEAD.